(12) United States Patent
Murff

(10) Patent No.: US 9,756,471 B1
(45) Date of Patent: *Sep. 5, 2017

(54) QUANTIFYING MOBILITY OF MOBILE DEVICES VIA A PRIVACY PRESERVING MOBILITY METRIC

(71) Applicant: Quantcast Corporation, San Francisco, CA (US)

(72) Inventor: Scott Michael Murff, Burlingame, CA (US)

(73) Assignee: Quantcast Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/476,211

(22) Filed: Mar. 31, 2017

Related U.S. Application Data

(63) Continuation of application No. 15/387,245, filed on Dec. 21, 2016, now Pat. No. 9,648,465, which is a continuation of application No. 14/983,122, filed on Dec. 29, 2015, now Pat. No. 9,571,964, which is a continuation of application No. 14/752,036, filed on Jun. 26, 2015, now Pat. No. 9,307,357, which is a continuation of application No. 14/529,505, filed on Oct. 31, 2014, now Pat. No. 9,191,779, which is a continuation of application No. 13/927,860, filed on Jun. 26, 2013, now Pat. No. 8,965,336.

(51) Int. Cl.
*H04W 4/02* (2009.01)
*H04L 29/08* (2006.01)
*H04W 64/00* (2009.01)

(52) U.S. Cl.
CPC ....... *H04W 4/023* (2013.01); *H04L 29/08657* (2013.01); *H04W 64/00* (2013.01)

(58) Field of Classification Search
CPC ......... H04W 4/02; H04W 4/028; H04W 4/00; H04L 29/08657; G06Q 30/0251; G06Q 30/02
See application file for complete search history.

(56) References Cited

U.S. PATENT DOCUMENTS

| | | | | |
|---|---|---|---|---|
| 2007/0072553 | A1* | 3/2007 | Barbera | H04M 1/72577 455/67.11 |
| 2007/0247306 | A1* | 10/2007 | Case | A43B 3/0005 340/539.11 |
| 2009/0024419 | A1* | 1/2009 | McClellan | G06Q 40/02 705/4 |
| 2012/0215328 | A1* | 8/2012 | Schmelzer | G06F 19/3481 700/91 |

(Continued)

*Primary Examiner* — Dung Hong
(74) *Attorney, Agent, or Firm* — Robin W. Reasoner; Renee D. Jacowitz

(57) ABSTRACT

Embodiments of the invention generate metrics quantifying the mobility of a mobile device without persisting information related to the device's specific location at any given time. Specifically, at multiple intervals, a value of a mobility metric is computed based on the distance between the current location of the mobile device and a previously identified origin location of the mobile device. The values of the mobility metric computed over a period of time quantify the overall mobility of the mobile device. The mobility metric does not provide any information regarding the specific location of the mobile device at any given time.

18 Claims, 8 Drawing Sheets

(56) References Cited

U.S. PATENT DOCUMENTS

| | | | | |
|---|---|---|---|---|
| 2012/0254934 A1* | 10/2012 | McBrearty | ......... | G06F 19/3481 725/118 |
| 2013/0006674 A1* | 1/2013 | Bowne | ............... | G06Q 10/0639 705/4 |
| 2015/0058357 A1* | 2/2015 | Jackson | ............ | G06F 17/30241 707/748 |

* cited by examiner

| | ID ⌐212 | Delta Distance ⌐214 | Timestamp ⌐216 |
|---|---|---|---|
| 218 { | A343SG244 | 0 | 1366743021 |
| | A343SG244 | 0 | 1366736400 |
| | ⋮ | ⋮ | ⋮ |
| 220 { | A343SG244 | >5 | 1366738200 |
| | A343SG244 | >5 | 1366742700 |
| | ⋮ | ⋮ | ⋮ |
| 222 { | A343SG244 | >25 | 1366699500 |
| 224 { | A343SG244 | >5000 | 1366847400 |

FIG. 2B

QUANTIFYING MOBILITY OF MOBILE DEVICES VIA A PRIVACY PRESERVING MOBILITY METRIC

CROSS-REFERENCE TO RELATED APPLICATIONS

This application is a continuation of U.S. Non-Provisional application Ser. No. 15/387,245 entitled "Quantifying Mobility of Mobile Devices Via a Privacy Preserving Mobility Metric" by Scott Michael Murff, filed on Dec. 21, 2016, which is a continuation of U.S. Non-Provisional application Ser. No. 14/983,122 entitled "Quantifying Mobility of Mobile Devices Via a Privacy Preserving Mobility Metric" by Scott Michael Murff, filed on Dec. 29, 2015, now U.S. Pat. No. 9,571,964 issued on Feb. 14, 2017, which is a continuation of U.S. Non-Provisional application Ser. No. 14/752,036 entitled "Quantifying Mobility of Mobile Devices Via a Privacy Preserving Mobility Metric" by Scott Michael Murff, filed on Jun. 26, 2015, now U.S. Pat. No. 9,307,357 issued on Apr. 5, 2016, which is a continuation of U.S. Non-Provisional application Ser. No. 14/529,505 entitled "Quantifying Mobility of Mobile Devices Via a Privacy Preserving Mobility Metric" by Scott Michael Murff, filed on Oct. 31, 2014, now U.S. Pat. No. 9,191,779 issued on Nov. 17, 2015, which is a continuation of U.S. Non-Provisional application Ser. No. 13/927,860 entitled "Quantifying Mobility of Mobile Devices Via a Privacy Preserving Mobility Metric" by Scott Michael Murff, filed on Jun. 26, 2013, now U.S. Pat. No. 8,965,336 issued on Feb. 24, 2015, all of which are hereby incorporated by reference in their entirety.

BACKGROUND

1. Technical Field

This invention pertains in general to analyzing behavior of entities, and in particular to quantifying the mobility of entities via a privacy preserving mobility metric.

2. Description of Related Art

With the advent of smart mobile devices, such as smart phones and tablets, entities operating those devices have the ability to consume content over the mobile network on the go. Being able to capture information related to the mobility of the devices and, therefore, entities operating those devices is highly desirable as it allows service providers and advertisers to tailor content presented to those entities according to their mobility.

Typical solutions for capturing mobility related information involve storing the specific locations that a mobile device has visited over a period of time. Such solutions are highly undesirable as they invade the privacy of the entities operating the mobile device as to the locations those entities visit. Consequently, a technique for quantifying the mobility of entities without invading the privacy of those entities is desired.

SUMMARY

Embodiments of the invention include a method, a non-transitory computer readable storage medium and a system for quantifying the mobility of a mobile device without transmitting the device's location. Specifically, an origin location of a mobile device is determined, and, periodically, a value of a mobility metric associated with the device is determined as the current distance from the origin. The values of the mobility metric computed over a period of time quantify the overall mobility of the mobile device. The mobility metric does not provide any information regarding the specific location of the mobile device at any given time.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 2B illustrates the values of the mobility metric as the mobile device traverses the path of FIG. 2A, in accordance with an embodiment of the invention

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention generate metrics quantifying the mobility of a mobile device without persisting information related to the device's specific location at any given time. Specifically, a mobility metric indicating the distance between the current location of the mobile device and a previously identified origin location of the mobile device. The values for the mobility metric computed over a period of time quantify the overall mobility of the mobile device. The mobility metric does not provide any information regarding the specific locations of the mobile device. Therefore, the mobility of the device can be quantified while maintaining privacy as to the specific locations the entities operating the mobile device have visited.

Figure 1:
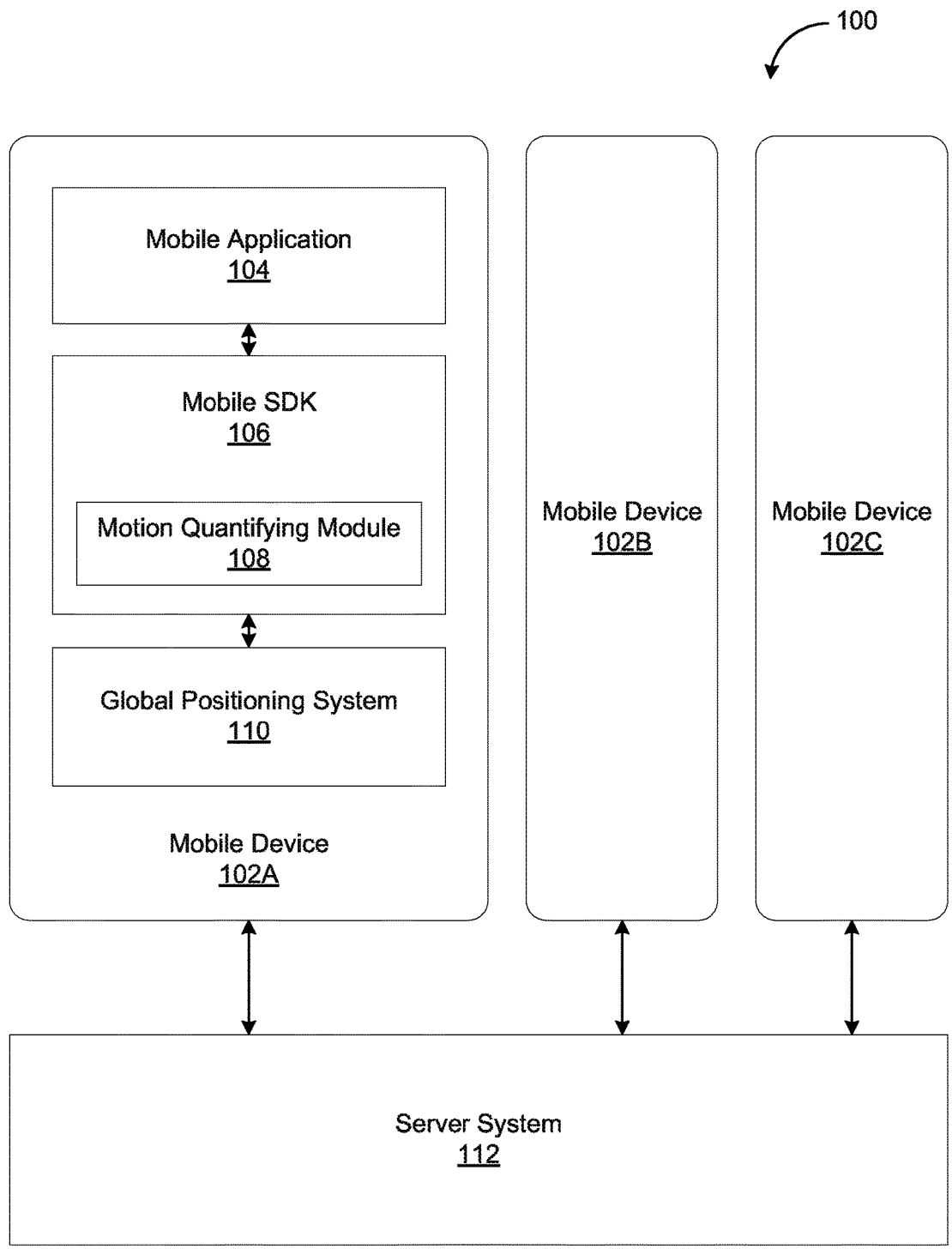
FIG. 1 is a computing environment, in accordance with an embodiment of the invention.

FIG. 1 is a computing environment 100, in accordance with an embodiment of the invention. As shown, the computing environment 100 includes mobile devices 102A, 102B and 102C and a server system 112.

Each mobile device 102A, 102B and 102C is a computing device with a processor and a memory. Each mobile device 102A, 102B and 102C may be, for example, a mobile phone, a laptop, a tablet computer, an augmented reality (AR) device or a dedicated digital content consumption device. For convenience of explanation, only the operation of mobile device 102A is described in detail below. Mobile devices 102B and 102C operate in substantially the same way as mobile device 102A.

Mobile device 102A includes the mobile application 104, a mobile software development kit (SDK) and a global positioning system (GPS) 110. The mobile application 104 performs and/or supports many different types of transactions. A transaction may be an action performed via the application, such as a purchase of an item or consumption of a content item, or an operation performed by the application itself, such as a communication with a different application. Each transaction may generate valuable information that can be collected and analyzed for different purposes.

The mobile SDK 106 (also referred to herein as "the SDK 106") periodically collects information from the mobile application 104 and transmit the information to the server system 112 via a network (not shown). The information may be related to transactions performed or supported by the mobile application 104. In operation, the mobile application 104 integrates with the SDK 106, permitting the SDK 106 to collect information from the mobile application 104 and the mobile device 102A. In one embodiment, the SDK 106 collects the information in association with an identifier determined via the mobile application 104. The identifier may be a unique identifier associated with the mobile application 104, a group of applications that includes the mobile application 104 or the mobile device 102A. The identifier is anonymized, such that the identifier does not reveal the identity of entities operating the mobile device 102A.

The mobile SDK 106 also collects mobility information indicative of the overall mobility of the mobile device 102A. Specifically, the motion quantifying module 108 periodically determines the current location of the mobile device 102A and processes the current location to compute a value of a mobility metric that quantifies the mobility of the mobile device 102A over a period of time. For example, at a given point in time, the value of the mobility metric may indicate the distance between the current location of the mobile device 102A and an origin location for the mobile device 102A. As another example, at a given point in time, the value of the mobility metric may indicate the number of days over a given time period where the mobile device 102A has been further than 30 miles from the origin location.

In operation, the motion quantifying module 108 identifies the origin location for the mobile device 102A using location information received from the GPS 110. The GPS 110 is a global positioning system receiver in the mobile device 102A. The global positioning system is a space-based satellite system that determines the location of the mobile device 102A via one or more GPS satellites. The location of the mobile device 102A as determined by the GPS 110 is typically captured as a set of longitude and latitude coordinates. In response to receiving a request from the motion quantifying module 108, the GPS 110 determines the location of the mobile device 102A and transmits the location to the motion quantifying module 108. In alternate embodiments, the motion quantifying module 108 may determine the location of the mobile device 102 using any other technically feasible mechanism, such as using measurements collected from an accelerometer (not shown) in the mobile device 102A.

The motion quantifying module 108 identifies the origin location by monitoring the locations of the mobile device 102A requested from the GPS 110 over a period of time. The motion quantifying module 108 then applies known patterns to the monitored locations to identify the origin location. For example, the motion quantifying module 108 may analyze the monitored locations to identify the location that the mobile device 102A is present at the longest, or returns to most frequently, as the origin location. As another example, the motion quantifying module 108 may analyze the monitored locations to identify the location that the mobile device 102A is present at during certain hours of the day, e.g. nighttime hours, as the origin location.

In another embodiment, the motion quantifying module 108 may select an arbitrary origin location such as the location requested from the GPS 110 when the motion quantifying module 108 is first instantiated. In such an embodiment, the motion quantifying module 108 may refine the origin location over time according to the known patterns described above.

Once the origin location is identified, the motion quantifying module 108 periodically requests the current location of the mobile device 102A from the GPS 110. Upon receiving a current location of the mobile device 102A, the motion quantifying module 108 computes the distance between the origin location and the current location (referred to herein as the "delta distance"). In one embodiment, the motion quantifying module 108 computes the delta distance using the Haversine formula. The motion quantifying module 108 determines the current value of the mobility metric based on the delta distance.

In one embodiment, the motion quantifying module 108 sets the current value of the mobility metric as the computed delta distance. In an alternative embodiment, the motion quantifying module 108 selects, depending on the delta distance, a value on a mobility index as the current value of the mobility metric. The index may be arranged as a series of distances, such as 0, 25, 50, 100, 500, 1,000, 5,000 miles, or a series of classifications, such as numbers representing high (100), medium (50), low mobility (0). In the case where the index is arranged as a series of distances, if the delta distance is greater than or equal to 0 miles and is less than 25 miles, then 0 is selected as the current value of the mobility metric. Similarly, if the delta distance is greater than or equal to 1000 miles and is less than 5000 miles, then 1000 is selected as the current value of the mobility metric. In the case where the index is arranged as a series of classifications, if the delta distance is greater than or equal to 0 miles and is less than 100 miles, then low mobility (0) is selected as the current value of the mobility metric. Similarly, if the delta distance is greater than or equal to 500 miles, then high mobility (100) is selected as the current value of the mobility metric.

The SDK 106 transmits the values of the mobility metric to the server system 112 via a network (not shown). In one embodiment, the mobility metrics may be transmitted in association with an identifier associated with the mobile application 104, a pre-identified portion of the mobile application 104, a group of applications that includes the mobile application 104 or a category of applications, content or transactions. An exemplary category of applications may be "expense report applications," and exemplary category of content may be "celebrity news content," and an exemplary category of transactions may be "request for driving directions." In such an embodiment, the mobility metrics captured on various mobile devices on which the mobile application 104 is installed is associated with the same identifier. Such mobility metrics are referred to herein as cohort mobility metrics, i.e., mobility metrics associated with a cohort of entities. In an alternate embodiment, the mobility metrics may be transmitted in association with an identifier associated with the mobile device 102A or one or more operators of the mobile application 104. In such an embodiment, the mobility metric captured on one mobile device is associated with a different unique identifier relative to the mobility metric captured on a different mobile device. Such mobility metrics are referred to herein as device mobility metrics, i.e., mobility metrics associated with the particular device.

In a preferred embodiment, the SDK 106 transmits along with each value of the mobility metric a timestamp corresponding to when the mobile device 102A was present at the location for which the value was computed. Modules similar to SDK 106 executing in mobile devices 102B and 102C also transmit transaction and mobility metric information associated with the mobile devices to the server system 112. The server system 112 stores and analyzes information received from the mobile devices 102A, 102B and 102C to develop insights into mobility patterns associated with individual mobile devices or a cohort of entities, such as the audience of all installations of the mobile application 104, without having access to information specifying the geographic location of the mobile device entity at any point in time, thus preserving the privacy of entities operating the mobile device.

Figure 2A:
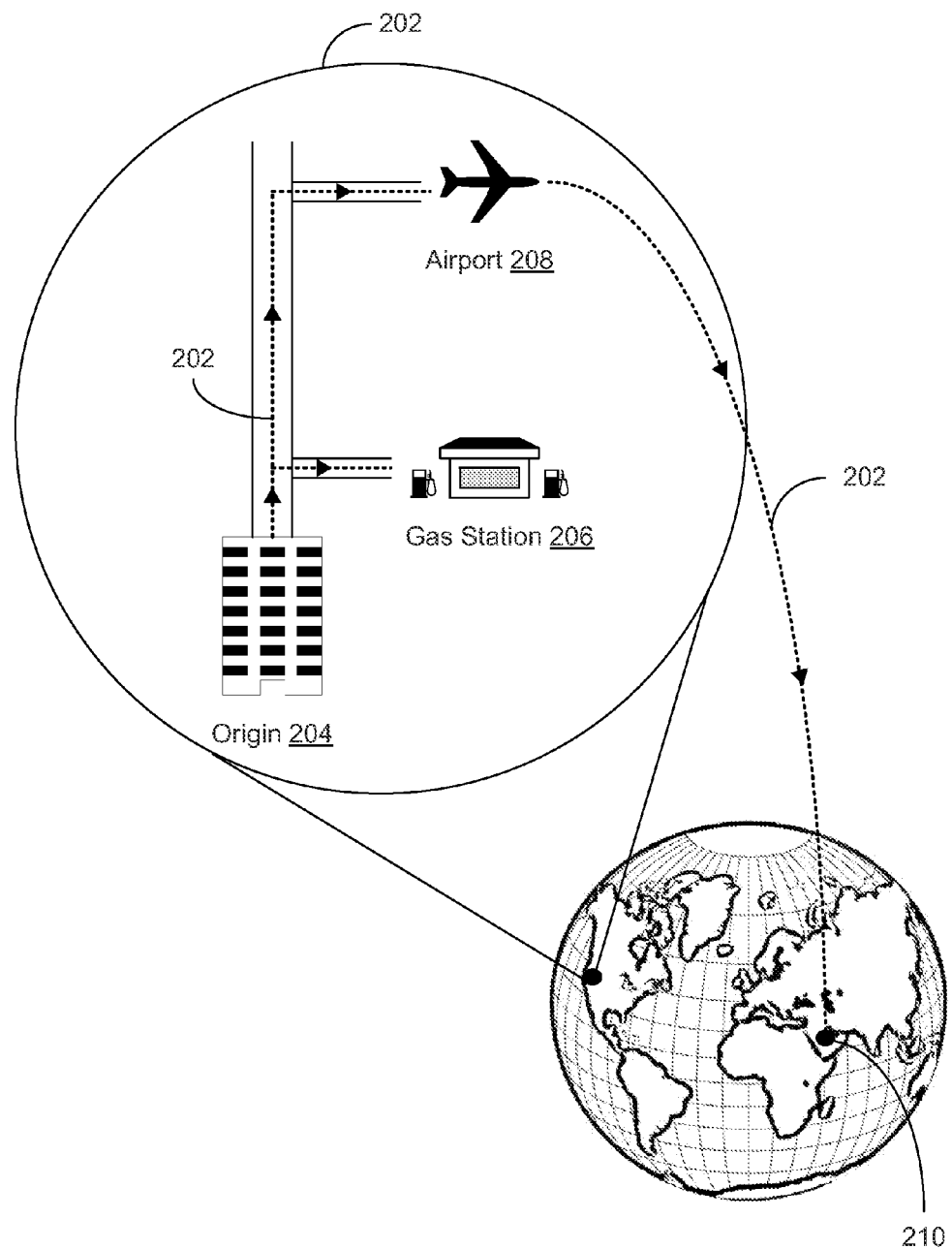
FIG. 2A illustrates a path traversed by the mobile device of FIG. 1, in accordance with an embodiment of the invention.

FIG. 2A illustrates a path 202 traversed by the mobile device 102A of FIG. 1, in accordance with an embodiment of the invention. As shown, the mobile device 102A is first located at origin 204 for the mobile device 102A. The mobile device 102A then traverses the path 202 to travel to the gas station 206, the airport 208 and finally a hotel 210 in Riyadh, Saudi Arabia. The gas station 206 is over 5 miles but less than 25 miles away from the origin 204, the airport 208 is over 25 miles but less than 50 miles away from the origin 204 and the hotel 210 is over 5,000 miles from the origin 204.

As the mobile device 102A traverses the path 202, the motion quantifying module 108 computes values of the mobility metric in the manner discussed above. In one example, at any given time, the value of the mobility metric indicates the distance between the origin 204 and the current location of the mobile device 102A.

FIG. 2B illustrates the values of the mobility metric as the mobile device 102A traverses the path 202 of FIG. 2A, in accordance with an embodiment of the invention. The values are illustrated in a table having an ID column 212, a distance column 214 and a timestamp column 216. The ID column 212 stores the ID associated with the mobile device 102A. The delta distance column 214 stores the value of the mobility metric at different points in time. The timestamp column 216 stores the timestamps associated with values of the mobility metric.

Rows 218 correspond to points in time when the mobile device 102A was located at origin 204. The values of the mobility metric in rows 218 are "0," indicating that the distance between the origin 204 and the location of the mobile device 102A was less than/equal to 5 miles. Rows 220 correspond to points in time when the mobile device 102A was located at gas station 206. The values of the mobility metric in rows 220 are ">5," indicating that the distance between the origin 204 and the location of the mobile device 102A was greater than 5 miles and less than/equal to 25 miles. Row 222 corresponds to a point in time when the mobile device 102A was located at the airport 208. The value of the mobility metric in row 222 is ">25," indicating that the distance between the origin 204 and the location of the mobile device 102A was greater than 25 miles and less than/equal to 50 miles. Row 224 corresponds to a point in time when the mobile device 102A was located at hotel 210. The value of the mobility metric in row 224 is ">5000," indicating that the distance between the origin 204 and the location of the mobile device 102A was greater than 5000 miles.

The values of the mobility metric are transmitted to the server system 112 for storage and further processing as described below in conjunction with FIG. 3. It is noted that the actual geographical location of the entity is not transmitted to the server system 112, thus preserving the entity's privacy.

Figure 3:
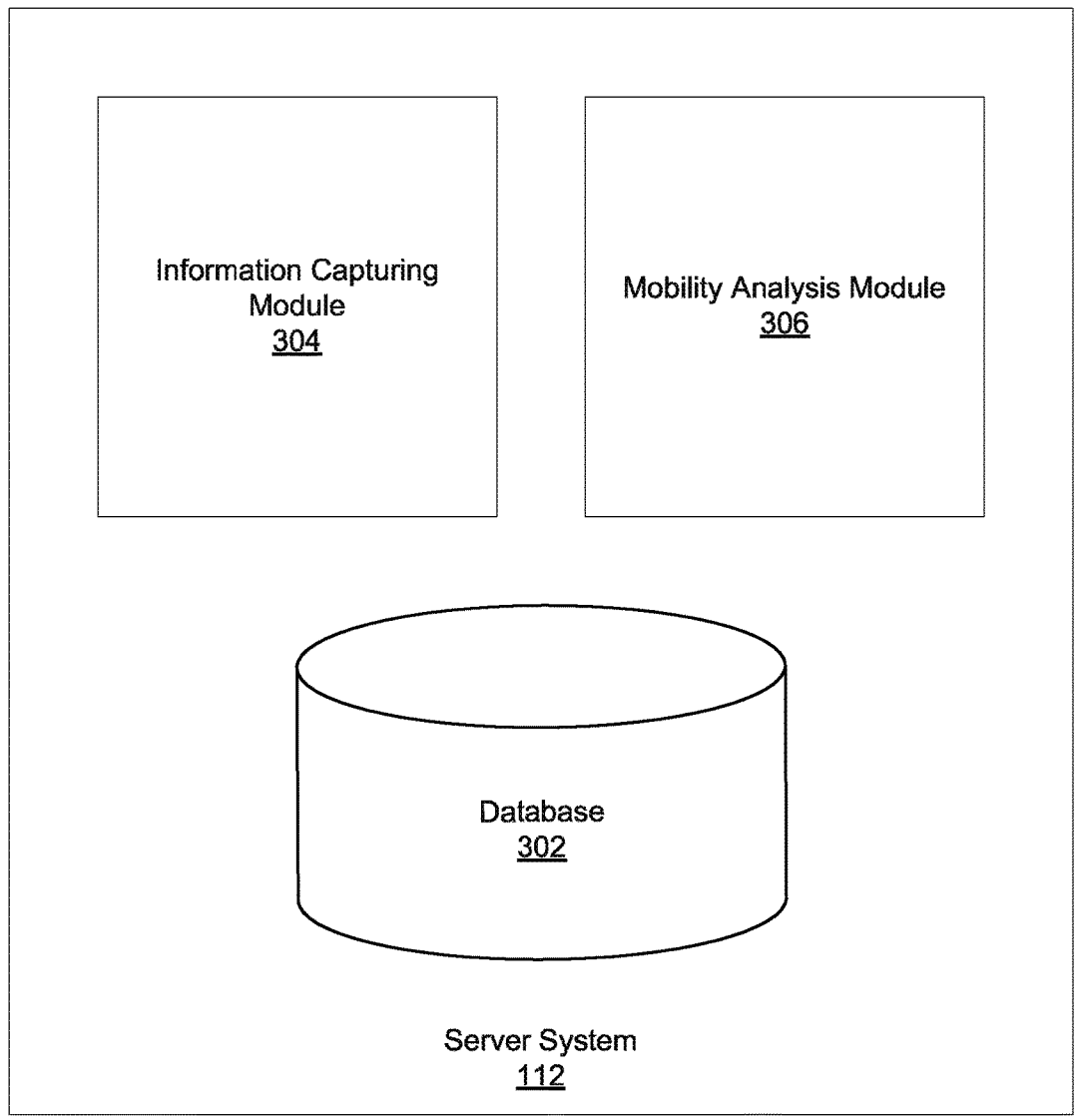
FIG. 3 is a high-level block diagram of the server system of FIG. 1, in accordance with an embodiment of the invention.

FIG. 3 is a high-level block diagram of the server system 112 of FIG. 1, in accordance with an embodiment of the invention. As shown, the server system 112 includes a database 302, an information capturing module 304 and a mobility analysis module 306.

The server system 112 stores information and mobility metrics received from the mobile devices and processes the information to generate reports analyzing the mobility of individual mobile devices or a cohort of entities, such as an audience of all installations of the mobile application 104. In some embodiments, the server system 112 is implemented as a single server, while in other embodiments the server system 112 is implemented as a distributed system of multiple servers. For convenience of explanation, the server system 112 is described below as being implemented on a single server system.

The database 302 stores information and mobility metrics received from mobile devices 102A, 102B and 102C. The database 302 is shown as internal to the server system 112, but in other implementations, database 302 may be external to or remote from the server system 112. Also, only one instance of database 302 is shown in FIG. 2 for clarity, but in practice, the consumption histories may be stored in a plurality of databases, such as a distributed network of storage facilities.

The information capturing module 304 receives information with different entities from the mobile devices 102A, 102B and 102C. In one embodiment, the information is received in conjunction with an identifier determined at the mobile device 102. In alternate embodiment, the information is received in conjunction with raw data determined at the mobile device 102 that is used to generate an identifier. For example, the raw data may be software version information and screen resolution of the mobile device 102.

For transaction information, the information capturing module 304 receives descriptive information corresponding to the transaction. For a transaction involving the consumption of a content item, the descriptive information may include an identifier associated with the content item and supplemental information, such as demographic information associated with the entity, the time of the transaction, the operating system executing on the device from which the content item was consumed and other characteristics of the device (e.g., screen resolution). The information capturing module 304 transmits the descriptive information to the database 302 for storage in conjunction with the identifier.

The information capturing module 304 also receives values for mobility metrics from the mobile devices 102A, 102B and 102C. The information capturing module 304 transmits the values of the mobility metric to the database 302 for storage. As discussed above, the mobility metrics may be device mobility metrics, i.e., mobility metrics associated with the mobile device 102A, 102B or 102C, or may be cohort mobility metrics, i.e., mobility metrics associated with a mobile application, such as the mobile application 104, or a group of applications that includes the mobile application. Consequently, the mobility metrics are stored in the database 302 in conjunction with an anonymized identifier associated with the mobile device or an identifier associated with the mobile application.

The mobility analysis module 306 analyzes device mobility metrics to determine the overall mobility of mobile devices and generate further metrics and reports indicative of the metrics. For a particular mobile device, the mobility analysis module 306 retrieves each value of the mobility metric associated with the mobile device from the database 302. In one example, the mobility analysis module 306 analyzes the values of the mobility metric to determine the average distance metric of the mobile device over a given time period. The average distance metric indicates, on average, how far the mobile device travels from the origin location of the mobile device on average over the given time period. In another example, for the particular mobile device, the mobility analysis module 306 also analyzes the values of the mobility metric to determine the traveling frequency metric of the mobile device over a given time period. The traveling frequency metric indicates how frequently the mobile device travels from the origin location over the given time period. The traveling frequency metric may be determined for all distances from the origin location, i.e., how frequently the mobile device travels any distance from the origin location. Alternatively, the traveling frequency may be determined for a certain distance from the origin location, i.e., how frequently the mobile device travels more than the certain distance from the origin location.

The mobility analysis module 306 also analyzes mobility metrics associated with groups of mobile devices. A group of mobile devices or entities associated with the group of mobile devices have a characteristic in common. The common characteristic may be a particular device type or a demographic, such as a given age range, the installation or use of a particular application, such as the mobile application 104, or the presence in a particular operating environment, such as the mobile operating environment. For each mobile device in the group of mobile devices, the mobility analysis module 306 analyzes the values of the mobility metric associated with the mobile device to determine the average distance metric and the frequency metric as described above. The average distance metrics for the entire group may be combined to generate a group distance metric indicating how far the group of mobile devices travels on average over the given time period. Similarly, the traveling frequency metrics for the entire group may be combined to generate a group frequency metric indicating how frequently the group of mobile devices travels over the given time period.

In addition, the mobility analysis module 306 may classify the group of mobile devices into one or more classifications based on the average distance metrics and the frequency metrics of the mobile devices. In one example, a mobile device may be classified as high mobility if the associated average distance metric and traveling frequency metric are above a high threshold. Alternatively, a mobile device may be classified as medium mobility if the associated average distance metric and traveling frequency metric are above a medium threshold but below the high threshold. Similarly, a mobile device may be classified as low mobility if the associated average distance metric and traveling frequency metric are below the medium threshold.

Once the mobile devices in the group are classified, the mobility analysis module 306 identifies characteristic correlations for each classification. For example, for a particular classification, the mobility analysis module 306 analyzes demographic information of entities associated with the mobile devices. The demographic information is stored in the database 202 and may be determined based on information associated with those entities and stored in the database 302. Based on the analysis, the mobility analysis module 306 identifies demographics that are strongly correlated with being in the particular classification.

In one embodiment, the mobility analysis module 306 generates a report for the group of mobile devices that includes the average distance metrics and the traveling frequency metrics for the individual mobile devices, the group distance and group frequency metrics, the different classifications and any characteristic correlations for the different classifications.

In some cases, the mobility metric cannot be captured for a given mobile device (referred to herein as the "mobile device with the unquantifiable mobility"). In these cases, the average distance metric and the frequency metric of a particular mobile device similar to the mobile device with the unquantifiable mobility may be used to determine the mobility likelihood of the mobile device. Similarly, the group distance metric and the group frequency metric of a group of mobile devices having a characteristic in common with the device with the unquantifiable mobility may be used to determine the mobility likelihood of the mobile device.

In addition, the mobility analysis module 306 analyzes cohort mobility metrics, i.e., mobility metrics associated with a mobile application, a portion of the mobile application or a group of applications, to analyze the overall mobility of the cohort of entities that operate the mobile application(s) and generate further metrics and reports indicative of the metrics. The techniques implemented by the mobility analysis module 306 to analyze the cohort mobility metrics and generate further metrics are the same as those described above in conjunction with the analysis of the device mobility metrics.

The overall mobility of mobile devices or a cohort of entities, such as the audience of a particular mobile application, could be used in a variety of ways by application developers as well as advertisers. For example, mobile application developers may market their mobile applications that have a highly mobile audience to advertisers that have customer bases influenced heavily by travel transactions. In addition, the overall mobility of a cohort of entities may also influence the design of content publishing platforms. Platforms that are accessed by entities that are highly mobile may be designed such that content on those platforms can be more easily consumed by the mobile entities.

Figure 4:
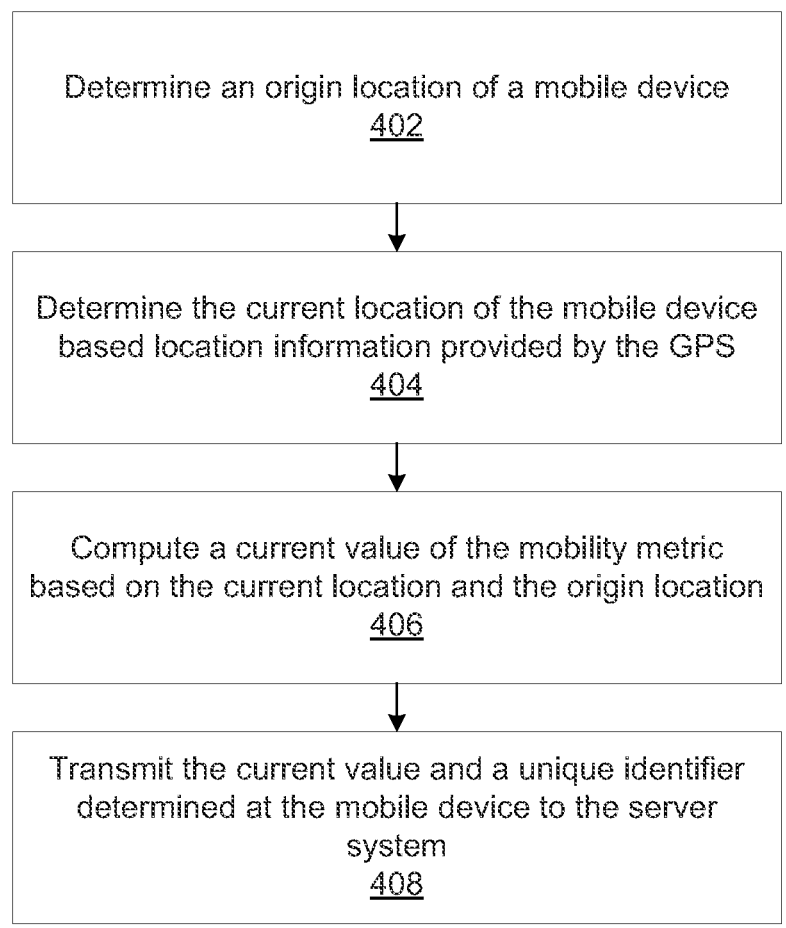
FIG. 4 is a flow chart illustrating a method of computing values of a mobility metric associated with a mobile device, in accordance with an embodiment the invention.

FIG. 4 is a flow chart illustrating a method of computing values of a mobility metric associated with a mobile device, in accordance with an embodiment the invention. The computation of the values may be performed, for example, by the motion quantifying module 108. In some implementations, the steps are performed in an order other than the order presented in FIG. 4, and in other implementations, additional or alternative steps may be performed.

In step 402, the motion quantifying module 108 identifies the origin location for the mobile device 102A using location information received from the GPS 110. In one embodiment, the motion quantifying module 108 identifies the origin location by monitoring the locations of the mobile device 102A over a period of time. The motion quantifying module 108 then applies known patterns to the monitored locations to identify the origin location.

In step 404, the motion quantifying module 108 determines the current location of the mobile device 102A based on the current location information provided by the GPS 110. In step 406, the motion quantifying module 108 computes a current value of the mobility metric based on the distance between the current location and the origin location. In step 408, the motion quantifying module 108 transmits the current value of the mobility metric to the server system 112 for storage and further processing. The actual geographical location of the mobile device is not transmitted to the server system 112, thus preserving the privacy of entities operating the mobile device as to their specific location at any given time.

Figure 5:
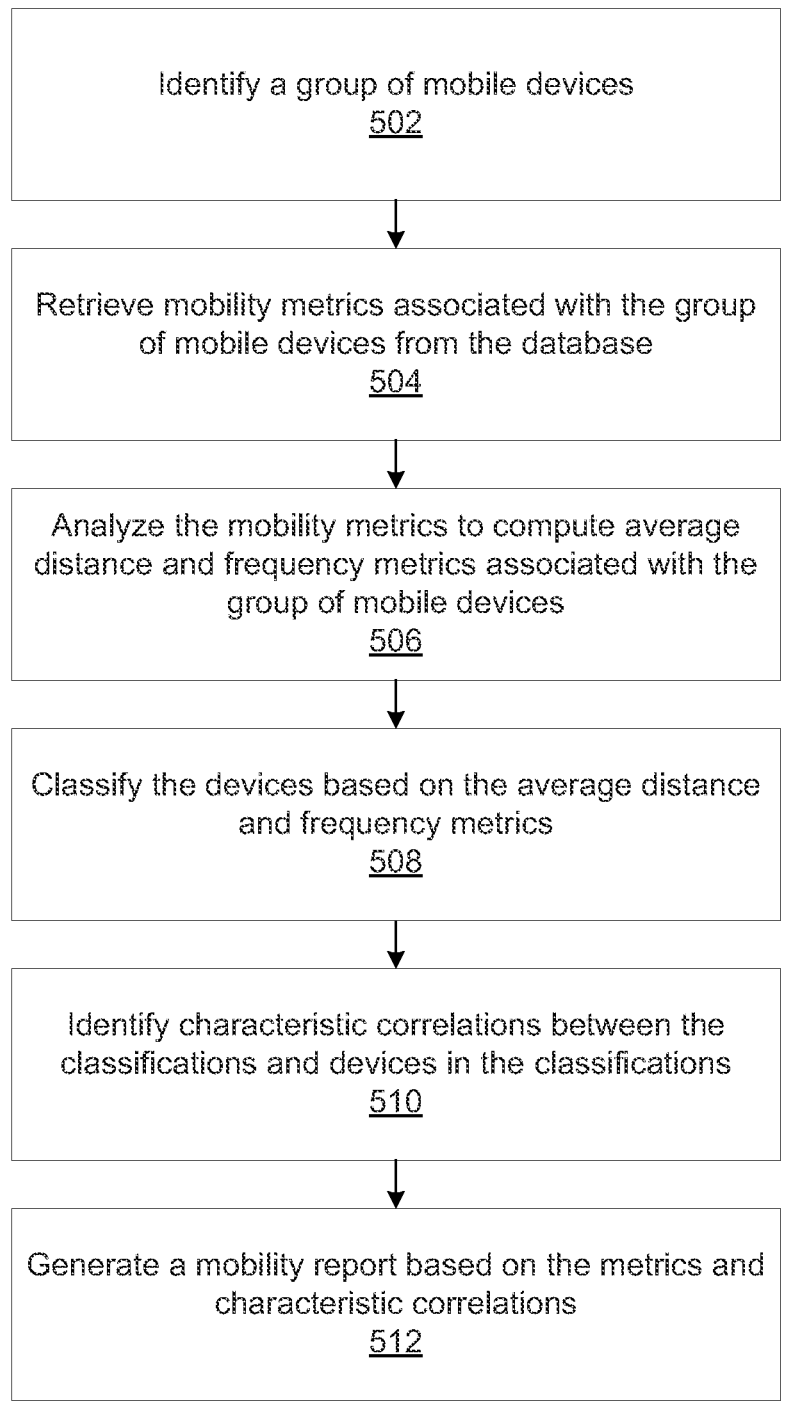
FIG. 5 is a flow chart illustrating a method of processing mobility metrics associated with a set of entities to generate a mobility report, in accordance with an embodiment of the invention.

FIG. 5 is a flow chart illustrating a method of processing mobility metrics associated with a set of entities to generate a mobility report, in accordance with an embodiment of the invention. The processing of mobility metrics may be performed, for example, by the mobility analysis module 306. In some implementations, the steps are performed in an order other than the order presented in FIG. 5, and in other implementations, additional or alternative steps may be performed.

At step 502, the mobility analysis module 306 identifies a group of mobile devices, each device having a particular characteristic. The characteristic of a device or an entity operating the device are typically determined based on the information stored in the database 202 in conjunction with the identifier determined at the mobile device. In one example, a particular mobile application is installed on each mobile device in the group of mobile devices identified at step 502.

At step 504, the mobility analysis module 306 retrieves from the database 202 values of the mobility metric associated with each mobile device in the set of group of mobile devices. At step 506, the mobility analysis module 306 analyzes the values of the mobility metric associated with each mobile device to determine the average distance metric and the frequency metric for the mobile device. The average distance metric indicates how far the mobile device travels on average from the origin location of the mobile device over the given time period. The frequency metric indicates how frequently the mobile device travels from the origin location over the given time period. In one embodiment, step 506 is performed by the mobile SDK such that the average distance metric and the frequency metric are computed by the mobile SDK 106 and transmitted to the mobility analysis module 306 of the server system 112 for further processing. Such an embodiment provides additional privacy protections to entities operating the mobile device.

At step 508, the mobility analysis module 306 classifies the mobile devices into one or more classifications based on the average distance metrics and the frequency metrics. The classifications may, for example, group the mobile devices into high mobility, medium mobility and low mobility. At step 510, the mobility analysis module 306 identifies distinguishing characteristic associated with mobile devices that are in the different classifications. In one example, a characteristic of the mobile devices may be determined based on transactions that have previously occurred on the mobile devices and are indicative of certain demographic information. For each classification, the mobility analysis module 306 analyzes the demographic information to identify demographics that are strongly correlated with being in the particular classification. For example, the mobility analysis module 306 may analyze the demographic information associated with the mobile devices that have installed the particular mobile application and are classified as high mobility to determine a high correlation with the 18-21 year old male demographic.

At step 512, the mobility analysis module 306 generates a mobility report associated with the group of mobile devices indicating the average distance metrics and the frequency metrics, the classifications and the correlations. The report may be used to develop insights into the mobility of the entities operating those mobile devices and make advertisement and/or content presentation decisions based on the mobility.

Figure 6:
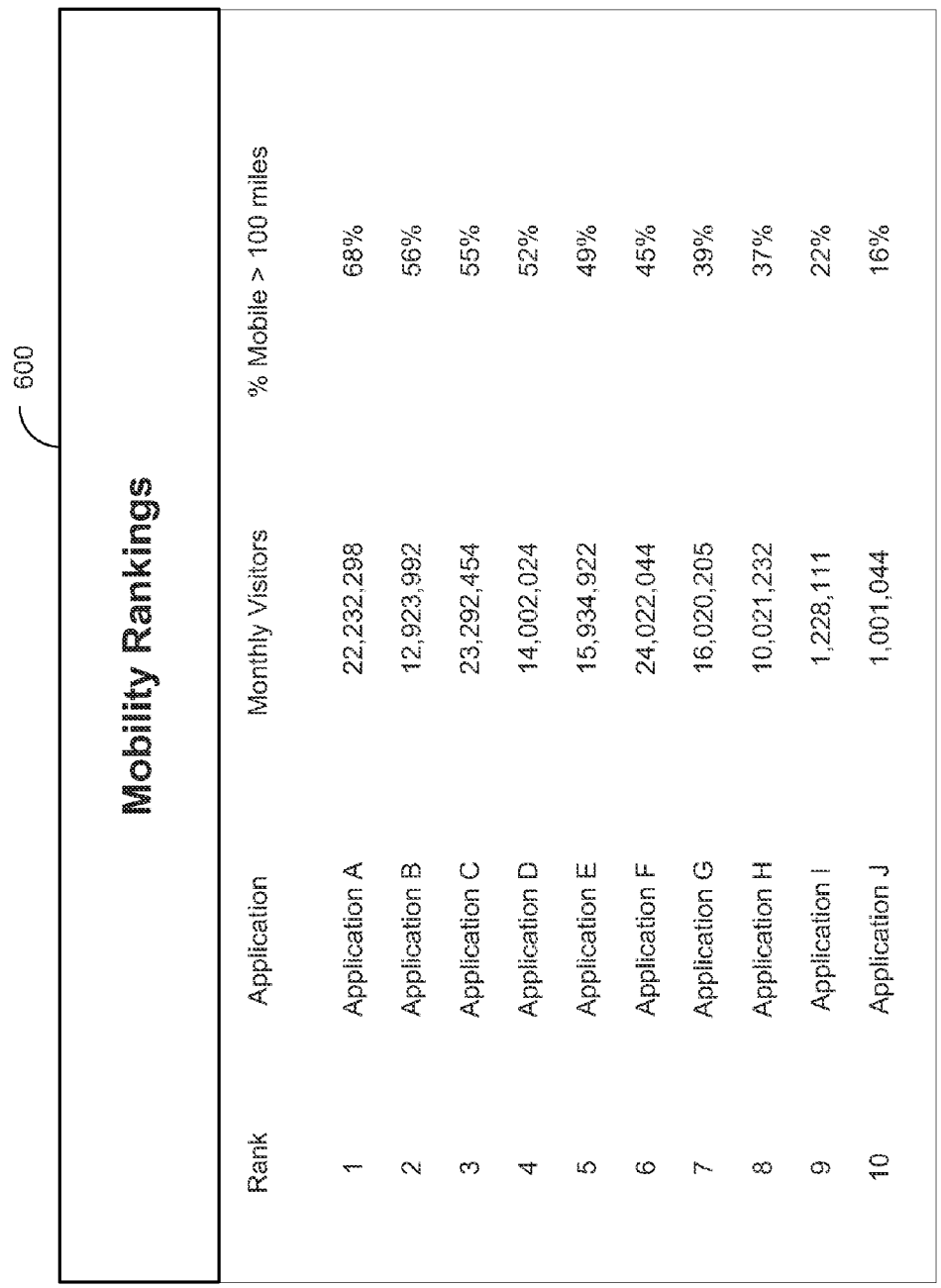
FIG. 6 is an exemplary illustration of a report generated based on cohort mobility metrics, in accordance with an embodiment of the invention.

FIG. 6 is an exemplary illustration of a report 600 generated based on cohort mobility metrics, in accordance with an embodiment of the invention. As shown, the report 600 ranks several applications according to a mobility ranking. The mobility ranking of a particular application is determined based on the percentage of visitors to the application, i.e., the cohort, that travel over 100 miles during a given month. As discussed above, such a report may be used for advertisement or content selection purposes.

Physical Components of a Computer

Figure 7:
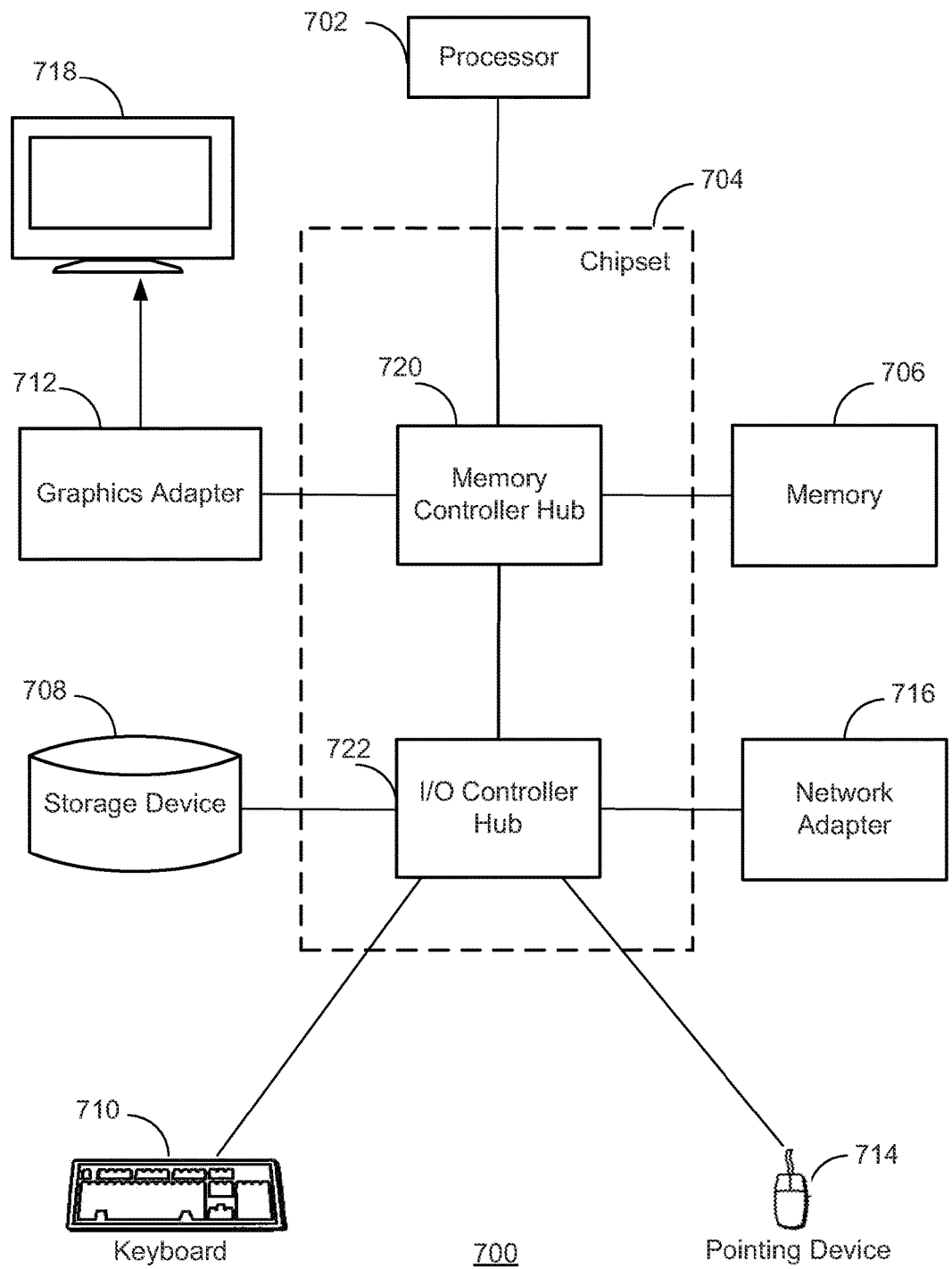
FIG. 7 is a high-level block diagram of the components of a computing system for use, for example, as the server system depicted in FIG. 1, in accordance with an embodiment.

FIG. 7 is a high-level block diagram of the components of a computing system 700 for use, for example, as the server system 112 or the mobile device 102A depicted in FIG. 1, in accordance with an embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is any non-transitory computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer 700. The graphics adapter 712 displays images and other information on the display 718. The network adapter 716 couples the computer 700 to a network.

As is known in the art, a computer 700 can have different and/or other components than those shown in FIG. 7. In addition, the computer 700 can lack certain illustrated components. In one embodiment, a computer 700 acting as a server may lack a keyboard 710, pointing device 714, graphics adapter 712, and/or display 718. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for quantifying the mobility of a mobile device. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method comprising:
   determining, at a mobile device, a location of the mobile device at each of a plurality of points in time;
   computing, at the mobile device, at least one value of a mobility metric according to a first delta distance between an origin location and a first determined location at a first point in time and according to a second delta distance between the origin location and a second determined location at a second point in time, the mobility metric indicating how frequently the mobile device travels more than a minimum distance from the origin location;
   transmitting the at least one value of the mobility metric from the mobile device to a server system, wherein the mobility metric does not provide information regarding the determined locations of the mobile device at any of the plurality of points in time; and
   receiving, responsive to the transmitted mobility metric, customized content at the mobile device, the customized content customized for the mobile device based at least in part on the at least one value of the mobility metric, regardless of the location of the mobile device at each of the plurality of points in time.

2. The method of claim 1, wherein determining a location of the mobile device at each of a plurality of points in time comprises requesting coordinates from a global positioning system included in the mobile device.

3. The method of claim 1, wherein the mobility metric is selected from an index of values.

4. The method of claim 1, wherein the mobility metric is selected from an index of classifications.

5. The method of claim 1, wherein computing at least one value of the mobility metric comprises computing by a motion quantifying module.

6. The method of claim 1, wherein transmitting the at least one value of the mobility metric from the mobile device to a server system comprises transmitting from a mobile software development kit.

7. A non-transitory computer readable storage medium storing processor-executable instructions, the instructions configured to be executed by the processor to implement a method comprising:
   determining, at a mobile device, a location of the mobile device at each of a plurality of points in time;
   computing, at the mobile device, at least one value of a mobility metric according to a first delta distance between an origin location and a first determined location at a first point in time and according to a second delta distance between the origin location and a second determined location at a second point in time, the mobility metric indicating how frequently the mobile device travels more than a minimum distance from the origin location;

transmitting the at least one value of the mobility metric from the mobile device to a server system, wherein the mobility metric does not provide information regarding the determined locations of the mobile device at any of the plurality of points in time; and receiving, responsive to the transmitted mobility metric, customized content at the mobile device, the customized content customized for the mobile device based at least in part on the at least one value of the mobility metric, regardless of the location of the mobile device at each of the plurality of points in time.

8. The medium of claim 7, wherein determining a location of the mobile device at each of a plurality of points in time comprises requesting coordinates from a global positioning system included in the mobile device.

9. The medium of claim 7, wherein the mobility metric is selected from an index of values.

10. The medium of claim 7, wherein the mobility metric is selected from an index of classifications.

11. The medium of claim 7, wherein computing at least one value of the mobility metric comprises computing by a motion quantifying module.

12. The medium of claim 7, wherein transmitting the at least one value of the mobility metric from the mobile device to a server system comprises transmitting from a mobile software development kit.

13. A system comprising:
a processor; and
a computer readable storage medium storing processor-executable computer program instructions, the computer program instructions comprising instructions for:
determining, at a mobile device, a location of the mobile device at each of a plurality of points in time;
computing, at the mobile device, at least one value of a mobility metric according to a first delta distance between an origin location and a first determined location at a first point in time and according to a second delta distance between the origin location and a second determined location at a second point in time, the mobility metric indicating how frequently the mobile device travels more than a minimum distance from the origin location;

transmitting the at least one value of the mobility metric from the mobile device to a server system, wherein the mobility metric does not provide information regarding the determined locations of the mobile device at any of the plurality of points in time; and receiving, responsive to the transmitted mobility metric, customized content at the mobile device, the customized content customized for the mobile device based at least in part on the at least one value of the mobility metric, regardless of the location of the mobile device at each of the plurality of points in time.

14. The system of claim 13, wherein determining a location of the mobile device at each of a plurality of points in time comprises requesting coordinates from a global positioning system included in the mobile device.

15. The system of claim 13, wherein the mobility metric is selected from an index of values.

16. The system of claim 13, wherein the mobility metric is selected from an index of classifications.

17. The system of claim 13, wherein computing at least one value of the mobility metric comprises computing by a motion quantifying module.

18. The system of claim 13, wherein transmitting the at least one value of the mobility metric from the mobile device to a server system comprises transmitting from a mobile software development kit.

\* \* \* \* \*